(12) United States Patent
Yan et al.

(10) Patent No.: US 9,121,999 B2
(45) Date of Patent: Sep. 1, 2015

(54) OPTICAL FILM AND DISPLAY DEVICE HAVING THE SAME

(71) Applicants:AU Optronics Corporation, Hsin-Chu (TW); University of Central Florida Research Foundation Inc., Orlando, FL (US)

(72) Inventors: Jin Yan, Orlando, FL (US); Da-Ming Xu, Orlando, FL (US); Hui-Chuan Cheng, Orlando, FL (US); Shin-Tson Wu, Oviedo, FL (US); Yi-Fen Lan, Hsin-Chu (TW); Cheng-Yeh Tsai, Hsin-Chu (TW)

(73) Assignees: AU OPTRONICS CORPORATION, Hsin-Chu (TW); UNIVERSITY OF CENTRAL FLORIDA RESEARCH FOUNDATION INC., Orland, FL (US)

( * ) Notice: Subject to any disclaimer, the term of this patent is extended or adjusted under 35 U.S.C. 154(b) by 182 days.

(21) Appl. No.: 13/953,871

(22) Filed: Jul. 30, 2013

(65) Prior Publication Data

US 2015/0036080 A1 Feb. 5, 2015

(51) Int. Cl.
*G02F 1/1335* (2006.01)
*G02B 5/04* (2006.01)

(52) U.S. Cl.
CPC .............. *G02B 5/045* (2013.01); *G02F 1/1335* (2013.01)

(58) Field of Classification Search
CPC ................. G02F 2001/133607; G02F 1/1335; G02B 5/045

USPC ................... 349/201, 65, 95, 57, 64; 359/619
See application file for complete search history.

(56) References Cited

U.S. PATENT DOCUMENTS 7,313,309 B2 * 12/2007 Numata et al. ................ 385/130
2006/0268418 A1 11/2006 Kim

FOREIGN PATENT DOCUMENTS

TW 200643474 12/2006
TW I350395 10/2011

OTHER PUBLICATIONS

Taiwan Office Action dated Mar. 25, 2015.

* cited by examiner

*Primary Examiner* — James Dudek
(74) *Attorney, Agent, or Firm* — McClure, Qualey & Rodack, LLP

(57) ABSTRACT

An optical film and a display device having the same are provided. The optical film has a light input face, a light output face opposite to the light input face, and a light-output structure disposed on the light output face. The light-output structure includes a plurality of light output microstructures such as prisms disposed side by side along a first direction on the light output face. Each prism has a first quadrilateral cross section parallel to the first direction. A first side of the quadrilateral cross section is connected to the light output face and includes a first angle with the light output face, wherein the first angles of the prisms continuously arranged have angle values varying in a periodic manner.

18 Claims, 10 Drawing Sheets

OPTICAL FILM AND DISPLAY DEVICE HAVING THE SAME

BACKGROUND

1. Technical Field

The present disclosure generally relates to an optical film. Particularly, the present disclosure relates to an optical film having light-output microstructures arranged in a periodic manner and a display device having the optical film.

2. Description of the Prior Art

In recent years, flat display devices have been widely used in a variety of fields as an independent display device or embedded in electronic devices for displaying information. There are all kinds of flat display devices including, for example, organic light-emitting diode display device, liquid crystal display device, electrophoretic display device, etc. Among them, liquid crystal display device is the most common flat display device.

For liquid crystal display device, the operation principle is to utilize the orientation of liquid crystal molecules in the liquid crystal display panel to control the transmission of backlight for each pixel so as to display images on the display face of the liquid crystal display device. In order to increase the viewing angle of the liquid crystal display device, i.e. the angle between the eyesight of viewer and the normal direction of the display face of the liquid crystal display device, a conventional way is to attach an optical film onto the display face of the liquid crystal display device. In addition, for other purposes, such as secrecy and privacy protection, an additional optical film can be attached onto the display face. In particular, for display devices using the blue phase liquid crystal (BPLC) panel, in order to enhance the optical effect, an optical film is usually attached onto the display face. However, the design of conventional optical films is very complicated. For example, two optical films with corresponding structures must align and overlap with each other, so the manufacturability is relatively low.

SUMMARY

It is an object of the embodiments of the present disclosure to provide an optical film, which increases the light emergent angle by means of an array of microstructures.

It is another object of the embodiments of the present disclosure to provide an optical film, which has high manufacturability and is capable of effectively controlling the range of light emergent angle.

In one embodiment, the embodiment of the present disclosure provides an optical film including a light input face, a light output face opposite to the light input face, and a light-output structure. The light-output structure is disposed on the light output face and includes a plurality of prisms disposed along a first direction on the light output face. Each prism has a first quadrilateral cross section parallel to the first direction. A first side of the first quadrilateral cross section is connected to the light output face and includes a first angle with the light output face. The first angles of the prisms continuously arranged have angle values varying in a periodic manner.

In one embodiment, the first quadrilateral cross section is a trapezoid cross section, and a second side of the first quadrilateral cross section is connected to the light output face and includes a second angle with the light output face, wherein the second angles of the prisms are the same and preferably an acute angle.

In one embodiment, the periodic manner preferably refers to one period having four continuously arranged prisms, and the angle values of the first angles of the four continuously arranged prisms are $\alpha-x$, $\alpha$, $\alpha+y$, and $\alpha$, respectively, wherein x is equal to or different from y; x and y are independently larger than 0 and less than 30 degrees; $\alpha$ is preferably an obtuse angle larger than 90 degrees and less than or equal to 169 degrees.

In another embodiment, the prisms are further arranged along a second direction on the light output face to form a microstructure array. Each prism has a second quadrilateral cross section parallel to the second direction. Each second quadrilateral cross section has a third side and a fourth side respectively connected to the light output face, wherein the third side of one second quadrilateral cross section includes an angle with the fourth side of another adjacent second quadrilateral cross section, and the angle is preferably an acute angle.

In another embodiment, the prisms are further arranged along a second direction on the light output face to form a microstructure array. Each prism has a second quadrilateral cross section parallel to the second direction. A third side of each second quadrilateral cross section is connected to the light output face and includes a third angle with the light output face, wherein the third angles of the prisms continuously arranged have angle values varying in a second periodic manner. In another embodiment, the second quadrilateral cross section is a trapezoid cross section, and a fourth side of the second quadrilateral cross section is connected to the light output face and includes a fourth angle with the light output face, wherein the fourth angles of the prisms are the same and preferably an acute angle.

In another embodiment, the second periodic manner preferably refers to one period having four continuously arranged prisms, and the angle values of the third angles of the four continuously arranged prisms are $\beta-t$, $\beta$, $\beta+s$, and $\beta$, respectively, wherein t is equal to or different from s; t and s are independently larger than 0 and less than 45 degrees; $\beta$ is preferably an acute angle larger than 45 degrees and less than 90 degrees.

In another embodiment, the embodiment of the present disclosure provides an optical film including a light input face, a light output face parallel to the light input face, and a light-output structure. The light-output structure is disposed on the light output face and includes a plurality of prisms disposed along a first direction and a second direction on the light output face to form a microstructure array, wherein each prism has a first quadrilateral cross section and a second quadrilateral cross section respectively parallel to the first direction and the second direction. Each first quadrilateral cross section has a first side and a second side respectively connected to the light output face. The first side of one of the first quadrilateral cross sections is adjacent to the second side of another adjacent first quadrilateral cross section. Each second quadrilateral cross section has a third side and a fourth side respectively connected to the light output face. The third side of one of the second quadrilateral cross sections is adjacent to and includes an angle with the fourth side of another adjacent second quadrilateral cross section; the angle is preferably an acute angle.

In one embodiment, the first side of one of the first quadrilateral cross sections is adjacent to and preferably includes an acute angle with the second side of another adjacent second quadrilateral cross section. In another embodiment, the first side of the first quadrilateral cross sections includes a first angle with the light output face, wherein the first angles of the prisms continuously arranged have angle values varying in a periodic manner.

The embodiments of the present disclosure further provide a display device to provide a visual effect of wide viewing angle by means of the optical film described above. In one embodiment, the display device includes a liquid crystal display panel, a backlight module, and the optical film described above. The liquid crystal display panel has a display face and a bottom face opposite to the display face. The backlight module is disposed on the bottom face and provides backlight to the liquid crystal display panel. The light input face of the optical film faces the display face of the liquid crystal display panel and receives light from the display face.

In one embodiment, the liquid crystal display panel is preferably a blue phase liquid crystal display panel. Furthermore, the light from the display face enters the light input face at an incident angle, wherein the incident angle is σ±Δσ degrees; σ is between 40 and 80 degrees; Δσ is between 2 and 15 degrees. In addition, the optical film can also have a function of polarizing light.

DETAILED DESCRIPTION OF THE PREFERRED EMBODIMENT

The embodiments of the present disclosure provide an optical film which is preferably applied to enhance the optical characteristics, such as increasing the light emergent angle from the light output face. In a preferred embodiment, the optical film is applied to a display device to increase the viewing angle of the display device. The optical film is preferably made of polymer or glass in an integral form. However, in other embodiments, the optical film can be made of other materials and by other methods.

Figure 1:
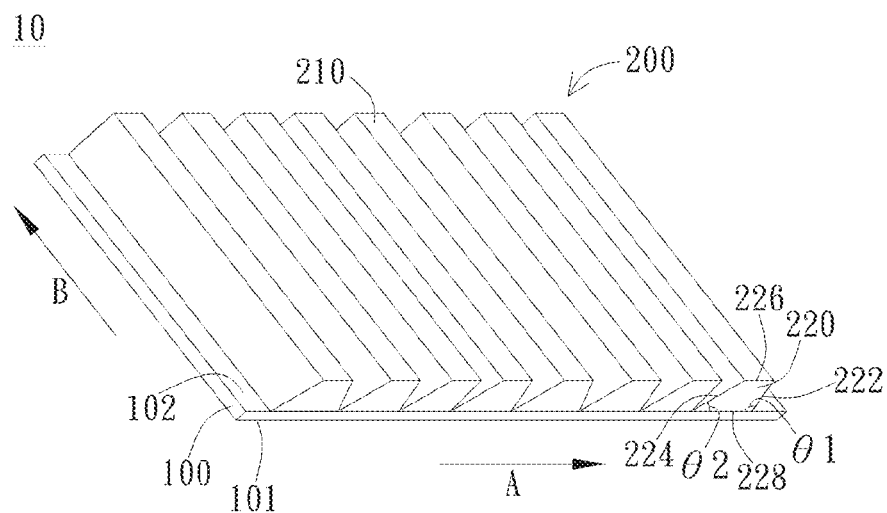
FIG. 1 is a schematic view of an embodiment of the optical film of the present disclosure.

In the embodiment of FIG. 1, the optical film includes a light input face 101, a light output face 102, and a light-output structure 200, wherein the light output face 102 is parallel and opposite to the light input face 101. That is, the light input face 101 and the light output face 102 are two opposite surfaces of the film body 100. In a preferred embodiment, the film body 100 has a rectangular shape. However, the film body 100 can have other suitable shapes according to different design needs. The light-output structure 200 is disposed on the light output face 102 and includes a plurality of light output microstructures such as prisms 210. The plurality of prisms 210 are disposed side by side along a first direction A on the light output face 102. Specifically, The prisms 210 are disposed immediately adjacent to each other along the first direction A, and each prism 210 extends from one end of the film body 100 to the other end of the film body 100 along a second direction B, wherein the second direction B is different from the first direction A and preferably perpendicular to the first direction A. Moreover, as shown in the figure, each prism 210 has a first quadrilateral cross section 220 parallel to the first direction A. That is, a normal line to the first quadrilateral cross section 220 is perpendicular to the first direction A, and a first side 222 of the first quadrilateral cross section 220 is connected to the light output face 102 and includes a first angle θ1 with the light output face 102, wherein the first angles of the prisms continuously arranged have angle values varying in a period manner (described later).

Figure 5:
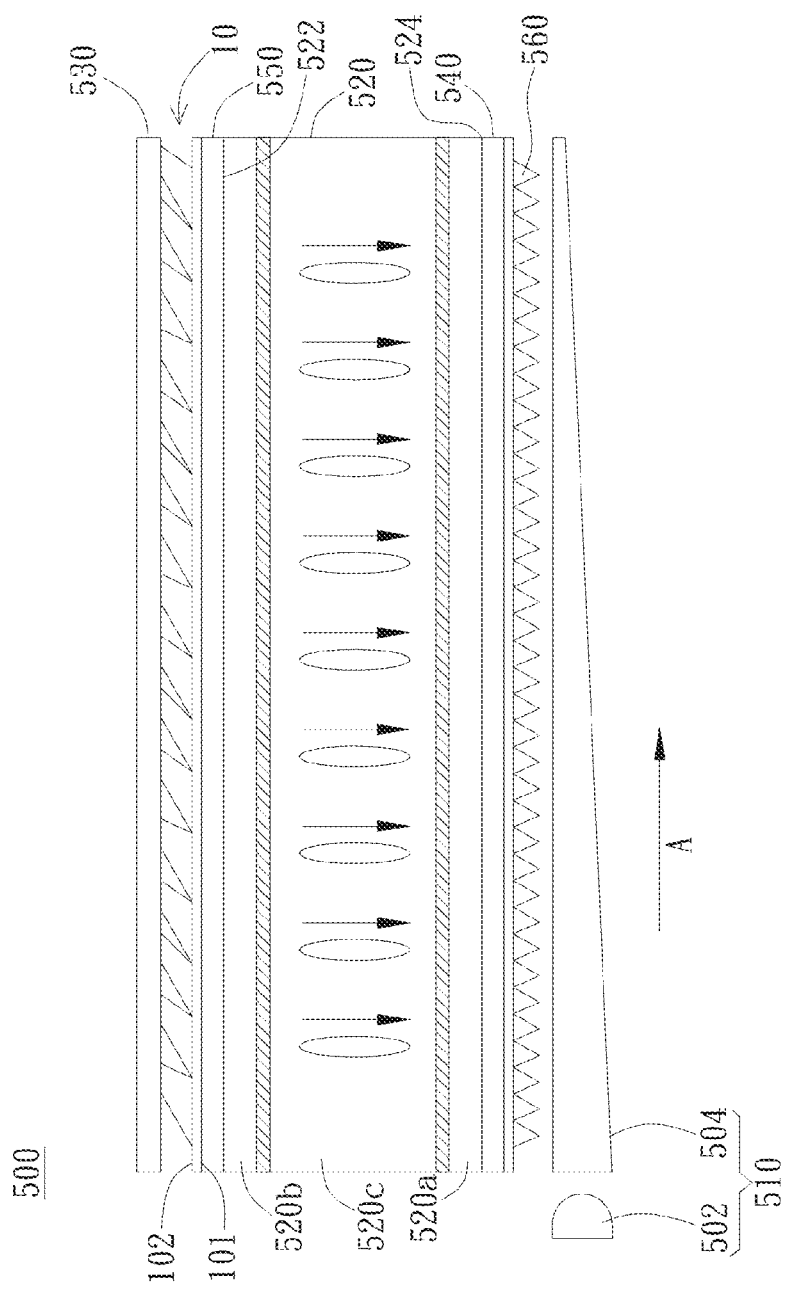
FIG. 5 is a schematic view of an embodiment of the display device of the present disclosure.

In a preferred embodiment, the first quadrilateral cross-section 220 is a trapezoid cross section, wherein the top face 226 of the trapezoid cross section is parallel to the bottom face 228, and the bottom face 228 is parallelly attached onto the light output face 102. Two opposite sides of the trapezoid cross section are respectively the first side 222 and the second side 224. Two ends of the first side 222 are respectively connected to the top face 226 and the bottom face 228 on one side, and the first angle θ1 is the inner bottom angle between the first side 222 and the bottom face 228 (i.e. the light output face 102). Similarly, two ends of the second side 224 are respectively connected to the top face 226 and the bottom face 228 on the other side, and the second side 224 is connected to the light output face 102 and includes a second angle θ2 with the light output face 102. That is, the second angle θ2 is another inner bottom angle between the second side 224 and the bottom face 228 (i.e. the light output face 102). It is noted that as the optical film is applied to a display device, the optical film is preferably disposed on the liquid crystal display panel in a manner that the first direction A is parallel to the light propagation direction of the light guide plate, so that the second side 224 including the second angle θ2 of each prism 210 of the light output structure 200 is closer to the light source 502 than the first side 222 including the first angle θ1, increasing the light emergent angle on the first direction A (as shown in FIG. 5).

In one exemplary embodiment, the height of the trapezoid cross section is the vertical distance between the top face 226 and the bottom face 228 and preferably between 5 μm and 50 μm. The bottom face 228 of the trapezoid cross section preferably has a width between 5 μm and 50 μm. The top face 226 of the trapezoid cross section preferably has a width between 1 μm and 50 μm. It is noted that the dimension of the trapezoid cross section can be varied according to design needs and not limited to the embodiment.

Figure 2:
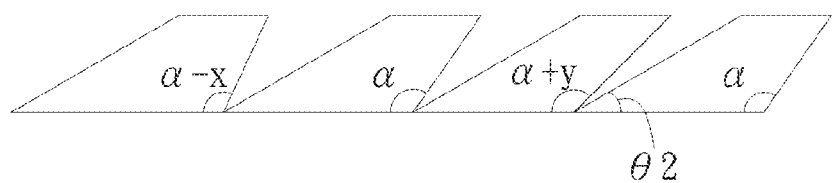
FIG. 2 is a schematic view showing four continuous prisms arranged in a periodic manner of an embodiment of the optical film of the present disclosure.

Moreover, the periodic manner mentioned above preferably refers to the first angles θ1 of the prisms 210 continuously arranged having a regular variation to achieve a desired optical characteristics, such as increasing viewing angle and uniformity. As shown in FIG. 2, a partial enlarged view of four first quadrilateral cross sections 220 continuously arranged along the first direction A is shown. In this embodiment, the periodic manner refers to one period having four continuously arranged prisms 210, and the angle values of the first angles θ1 of the four continuously arranged prisms 210 are α−x, α, α+y, and α, respectively, wherein x is equal to or different from y; x and y are independently larger than 0 and less than 30 degrees; α is preferably an obtuse angle larger than 90 degrees and less than or equal to 169 degrees. That is, the first angles θ1 of the prisms 210 can have multiple angle values (i.e. at least two different angle values), such as three different angle values, and the prisms 210 are arranged in a manner that the prisms having large angle value and the prisms having small angle value are alternatively disposed with the prisms having middle angle value interposed between the prism having large angle value and the prism having small angle value.

Taking three continuous periods as an example, in one embodiment, the angle values of the first angles θ1 of twelve continuous prisms 210 are sequentially (α−x, α, α+y, α), (α−, α, α+y, α), (α−x, α, α+y, α), (α−x, α, α+y, α), wherein four continuous prisms 210 having angle values of α−x, α, α+y, α are selected as one period. In another embodiment, the angle values of the first angles θ1 of twelve continuous prisms 210 are sequentially (α, α+y, α, α−x), (α, α+y, α, α−x), (α, α+y, α, α−x), (α, α+y, α, α−x), wherein four continuous prisms 210 having angle values of α, α+y, α, α−x are selected as one period. In a further embodiment, the angle values of the first angles θ1 of twelve continuous prisms 210 are sequentially (α+y, α, α−x, α), (α+y, α, α−x, α), (α+y, α, α−x, α), (α+y, α, α−x, α), wherein four continuous prisms 210 having angle values of α+y, α, α−x, α are selected as one period. In another further embodiment, the angle values of the first angles θ1 of twelve continuous prisms 210 are sequentially (α, α−x, α, α+y), (α, α−x, α, α+y), (α, α−x, α, α+y), (α, α−x, α, α+y), wherein four continuous prisms 210 having angle values of α, α−x, α, α+y are selected as one period. In another embodiment, the periodic manner refers to, in one period, the angle values of the first angles θ1 of three continuous prisms 210 being α−x, α, α+y. Taking twelve continuous prisms as an example, the angle values of the first angles θ1 are sequentially (α−x, α, α+y), (α−x, α, α+y), (α−x, α, α+y), (α−x, α, α+y). It is noted that the number of prisms 210 disposed along the first direction A is preferably an integral multiple of the number of prisms 210 in one period, i.e. M×N, wherein M, N are preferably an integer; M is the number of prisms 210 in one period; N is the number of periods. In the above embodiments, the number of prisms 210 disposed along the first direction A is 4×N or 3×N. However, in other embodiments, the number of prisms 210 disposed along the first direction A can be non-integral multiple of the number of prisms in one period, such as M×N+1, M×N+2, . . . , or M×N+(M−1) and not limited to the embodiments.

Moreover, for example, if α is 125 degrees, and x is equal to y and is 10 degrees, then α−x is 115 degrees, and α+y is 135 degrees. As such, the four continuously arranged prisms in FIG. 2, from left to right, sequentially have the first angles of 115, 125, 135, and 125 degrees. It is noted that α is preferably selected based on the refractive index of the optical film, so that the light incident onto the first side 222 will substantially emit from the front direction. In this embodiment, the refractive index of the optical film is preferably larger than 1 and more preferably between 1.485 and 2.20. Moreover, the "front direction" refers to a direction parallel to the normal direction of the light output face. It is noted that x and y can be the same or different to achieve a variety of light patterns and obtain a symmetric or asymmetric viewing angle on two sides with respect to the normal direction of the light output face. In addition, in this embodiment, the second angles θ2 of the prisms 210 are preferably the same and the second angle θ2 is preferably an acute angle, such as 30 degrees, but not limited thereto. In other embodiments, the second angle θ2 can be different to adjust the range of light emergent angle.

Figure 3A:
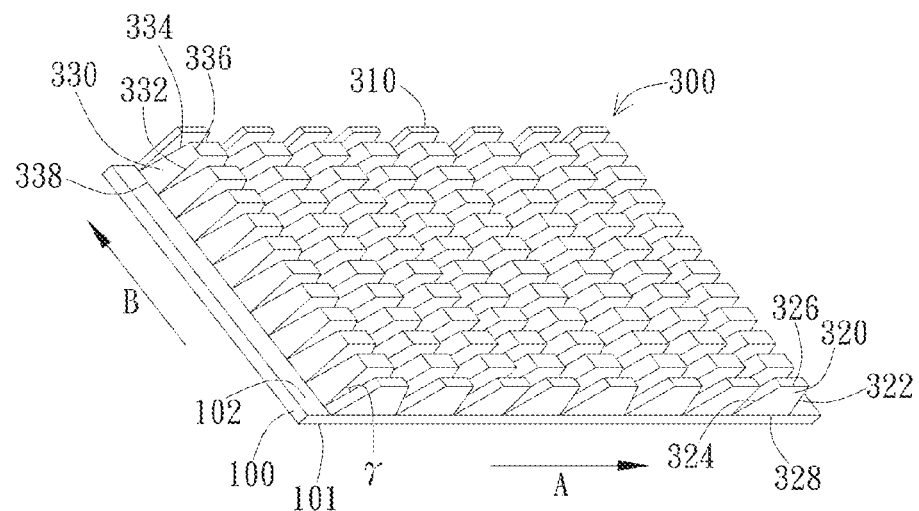
FIGS. 3A to 3C are a schematic view and cross-sectional views respectively along the first direction A and the second direction B of another embodiment of the optical film of the present disclosure.
Figure 3B:
Figure 3C:
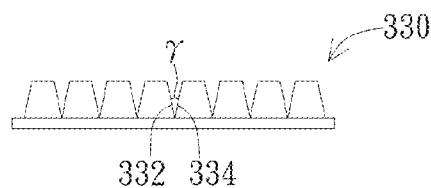

In the above embodiment, the prism 210 substantially extends along the entire length of the film body 100 in the second direction B. However, in other embodiments, the prisms may have other modifications. As shown in FIGS. 3A to 3C, in another embodiment, a plurality of prisms 310 are respectively disposed along the first direction A and the second direction B on the light output face 102 to form a microstructure array. That is, the length of the prism 310 in the second direction B is less than that of the prism 210, and the prisms 310 are also disposed side by side along the second direction B, so that each prism 310 has a second quadrilateral cross section 330 parallel to the second direction B, wherein a normal line to the second quadrilateral cross section 330 is perpendicular to the second direction B. Specifically, each prism 310 has the first quadrilateral cross section 320 parallel to the first direction A and the second quadrilateral cross section 330 parallel to the second direction B.

In this embodiment, the first quadrilateral cross section 320 and the second quadrilateral cross section 330 are preferably a trapezoid cross section, and the exemplary values of dimension of FIG. 1 can be applied to this embodiment. Furthermore, similar to the embodiment of FIG. 1, the first side 332 and the second side 324 of the first quadrilateral cross section 320 are respectively connected to opposite sides of the top face 326 and the bottom face 328, wherein the first side 322 of the first quadrilateral cross section 320 is connected to the light output face 102 and includes a first angle θ1, and the second side 324 of the second quadrilateral cross section 330 is connected to the light output face 102 and includes a second angle θ2. In addition, the second quadrilateral cross section 330 has a third side 332 and a fourth side 334. When the second quadrilateral cross section 330 is a trapezoid cross section, the top face 336 is parallel to the bottom face 338, and the bottom face 338 is parallelly attached onto the light output face 102, wherein two opposite sides of the trapezoid cross section serve as the third side 332 and the fourth side 334, respectively. Two ends of the third side 332 are respectively connected to the top face 336 and the bottom face 338 (i.e. the light output face 102) on one side, and two ends of the fourth side 334 are respectively connected to the top face 336 and the bottom face 338 (i.e. the light output face 102) on the other side. In this embodiment, the first quadrilateral cross section 320 is adjacent to the second quadrilateral cross section 330, wherein the second side 324 is connected to the third side 332. That is, the second side 324 of the first quadrilateral cross section 320 is the third side 332 of the second quadrilateral cross section 330. Moreover, in this embodiment, the first side 322 and the second side 324 of adjacent first quadrilateral cross sections 320 are preferably closely adjacent to each other. That is, the first side 322 of one first quadrilateral cross section 320 is connected to the second side 324 of another adjacent first quadrilateral cross section 320, and the prisms 310 are disposed in such a manner along the first direction A. Similarly, the third side 332 and the fourth side 334 of adjacent second quadrilateral cross sections 330 are preferably closely adjacent to each other. That is, the third side 332 of one second quadrilateral cross section 330 is connected to the fourth side 334 of another adjacent second quadrilateral cross section 330, and the prisms 310 are disposed in such a manner along the second direction B.

In this embodiment, the third side 332 and the fourth side 334 of adjacent second quadrilateral cross sections 330 include an angle γ, wherein the angle γ is preferably an acute angle, as shown in FIG. 3C. The prisms 310 disposed in array can further increase the light emergent angle in the second direction B. In addition, as the prisms 310 are disposed in array, the first angles θ1 of continuously arranged prisms 310 preferably also have angle values varying in a periodic manner, but not limited thereto. That is, in this embodiment, the periodic manner refers to one period having four continuously arranged prisms 310, and the angle values of the first angles θ1 of the four continuously arranged prisms 310 are α−x, α, α+y, and α, respectively, wherein x is equal to or different from y; x and y are independently equal to or larger than 0 and less than 30 degrees; α is preferably an obtuse angle larger than 90 degrees and less than or equal to 169 degrees. The selection of α, the arrangements of periodic manner, the number of prisms 310 disposed along the first direction A, etc. can be referred to the embodiment of FIG. 1 and will not elaborate hereinafter. In this embodiment, the second quadrilateral cross section 330 is a trapezoid cross section, and the bottom angles of the trapezoid cross section are equal. For example, as the angle γ is 20 degrees, the bottom angles are both 80 degrees. In other words, in FIG. 3C, the angle γ is an acute angle and the angle value of the angle γ is a constant, i.e. each second quadrilateral cross section 330 of the prisms 310 along the second direction B is an isosceles trapezoid. In addition, when the first angles θ1 of the prisms 310 are the same (i.e. x=y=0), it means that lights emergent from the prisms 310 substantially have a same angle range, suitable for specific direction of display applications, such as privacy filter.

Figure 4:
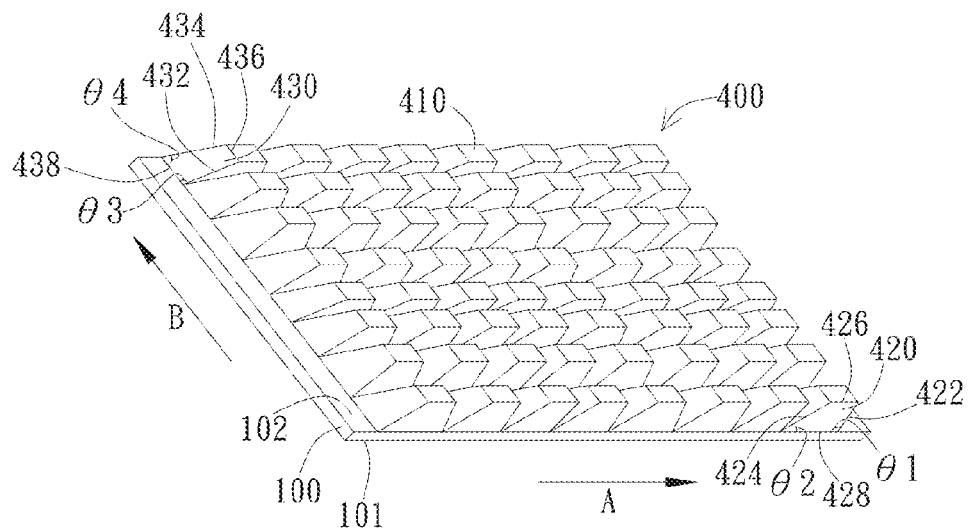
FIG. 4 is a schematic view of another embodiment of the optical film of the present disclosure.

In a variant embodiment of FIG. 3A, as shown in FIG. 4, the light output structure 400 includes a plurality of light output microstructures such as prisms 410 disposed along the first direction A and the second direction B to form a microstructure array. Similar to FIG. 3A, in the prism 410 of FIG. 4, the first side 422 and the second side 424 are respectively connected to opposite sides of the top face 426 and the bottom face 428 of the first quadrilateral cross section 420, and the third side 432 and the fourth side 434 are respectively connected to opposite sides of the top face 436 and the bottom face 438 of the second quadrilateral cross section 430. The prism 410 of FIG. 4 and the prism 310 of FIG. 3 are different in that the prisms 410 disposed along the second B have the third side 432 of the second quadrilateral cross section 430 connected to the light output face 102 and including a third angle θ3 with the light output face 102, wherein the third angles θ3 of continuously arranged prisms 410 also have angle values varying in a periodic manner. Specifically, the prisms 410 of the light output structure 400 disposed along the first direction A are preferably arranged in a manner that the first angles θ1 of continuously arranged prisms 410 will have angle values varying in a periodic manner. That is, the periodic manner in this embodiment refers to one period having four continuously arranged prisms 410, and the angle values of the first angles θ1 of the four continuously arranged prisms 410 being α−x, α, α+y, and α, respectively, wherein x is equal to or different from y; x and y are independently larger than or equal to 0 and less than 30 degrees; α is preferably an obtuse angle larger than 90 degrees and less than or equal to 169 degrees. Besides, the prisms 410 of the light output structure 400 disposed along the second direction B are preferably arranged in a manner that the third angles θ3 of continuously arranged prisms 410 will have angle values also varying in a periodic manner. That is, the periodic manner in this embodiment refers to one period having four continuously arranged prisms 410, and the angle values of the third angles θ3 of the four continuously arranged prisms 410 being β−t, β, β+s, and β, respectively, wherein t is equal to or different from s; t and s are independently larger than or equal to 0 and less than 45 degrees; β is preferably an acute angle larger than 45 degrees and less than 90 degrees.

Moreover, the fourth side 434 of the second quadrilateral cross section 430 is connected to the light output face 102 and includes a fourth angle θ4 with the light output face 102. In this embodiment, the fourth angles θ4 of the prisms 410 are preferably the same, and the fourth angle θ4 is preferably an acute angle, but not limited thereto. For example, when the third angles θ3 of continuously arranged prisms 410 have periodically varied angle values, and the fourth angles θ4 have a same angle value, then the angles γ between the third side 432 and the fourth side 434 of adjacent second quadrilateral cross sections 430 will also have angle values varying in a periodic manner. In a variant embodiment, the configuration (a) that the third angles θ3 can be the same, and the fourth angles θ4 have periodically varied angle values, or the configuration (b) that the third angles θ3 and the fourth angles θ4 are both designed to have periodically varied angle values, will achieve the same effect that the angles γ between the third side 432 and the fourth side 434 of adjacent second quadrilateral cross sections 430 will also have periodically varied angle values. As the prisms 410 are disposed in such a periodic manner along the first direction A and the second direction B, the light emergent angle from the light output face 102 in the first direction A and the second direction B can be controlled to achieve a wider viewing angle in multiple directions.

The embodiments of the present disclosure also provide a display device including the optical film 10 described in any of the above embodiments. As shown in FIG. 5, the display device 500 includes a backlight module 510, a liquid crystal display panel 520, and the optical film 10. The liquid crystal display panel 520 has a display face 522 and a bottom face 524 opposite to the display face 522. The backlight module 510 is disposed on the bottom face 524 of the liquid crystal display panel 520, wherein the backlight module 510 provides backlight to the liquid crystal display panel 520. The light input face 101 of the optical film 10 faces the display face 522 of the liquid crystal display panel 520 and receives light from the display face 522. In a preferred embodiment, the liquid crystal display panel 520 is a blue phase liquid crystal display panel that includes upper and lower substrates, and a blue phase liquid crystal layer 520c is sandwiched between the upper substrate 520b and the lower substrate 520a. In general, the lower substrate 520a is a circuit substrate for controlling the pixel electrode, and the upper substrate 520b is a color filer substrate for filtering light. The blue phase liquid crystal layer 520c has optical isotropicity, so that the blue phase liquid crystal layer 520c can realize the manipulation of display device in the vertical field switching electrode system. The backlight module 510 includes a light source 502 and a light guide plate 504, wherein the light guide plate 504 is disposed under the bottom face 524 of the liquid crystal display panel 520 and configured to guide light from the light source 502 into the bottom face 524 of the liquid crystal display panel 520. The light enters the liquid crystal display panel 520 from the bottom face 524 and emits, under the control of the blue phase liquid crystal layer 520c, from the display face 522 into the light input face 101 of the optical film 10 at an incident angle. Then, the optical film 10 reflects and guides the light to emit out from the light output face 102. The "incident angle" refers to the angle between the incident light and the normal line to the light input face 101. In this embodiment, the incident angle is σ±Δσ degrees, wherein a is preferably between 40 and 80 degrees, and Δσ is between 2 and 15 degrees. For example, the incident light is 70±5 degrees. That is, the incident angle is preferably between 65 and 75 degrees. The optical film 10 functions to reflect the light obliquely incident thereon by an incident angle of 70±5 degrees to a substantial front direction or a direction of predetermined light emergent angle and then out of the optical film 10 from the light output structure 200, 300 or 400 that is disposed on the light output face 102. In other words, after the light emitted from the light source 502 is transmitted through the light guide plate 504 and the microstructures 560 on the bottom face 524 of the liquid crystal display panel 520, the light having an incident angle of 70±5 degrees is formed and enters the light the liquid crystal display panel 520. Then, the oblique incident light enters the optical film having the light output structure 200, 300, or 400 and is guided or directed to the front direction (i.e. perpendicular to the display face 522 of the liquid crystal display panel 520) or to a direction of predetermined light emergent angle.

Furthermore, as shown in FIG. 5, the display device 500 further includes a diffusion plate 530, a first polarizer 540, and a second polarizer 550. The diffusion plate 530 is disposed to face the light output face 102 of the optical film 10, and the first polarizer 540 is disposed between the liquid crystal display panel 520 and the light guide plate 504 of the backlight module 510. The second polarizer 550 is disposed between the optical film 10 and the liquid crystal display panel 520. The diffusion plate 530, the first polarizer 540, and the second polarizer 550 are configured to enhance optical properties such as polarity, uniformity of the light. In this embodiment, the optical film 10 and the second polarizer 550 are two individual films. However, in other embodiments, the optical film 10 and the second polarizer 550 can be integrated into a single film, so that the optical film will also have a function of polarizing light. Such a composite film can enhance the assembly efficiency, minimize the thickness, and increase optical efficiency.

Figure 6:
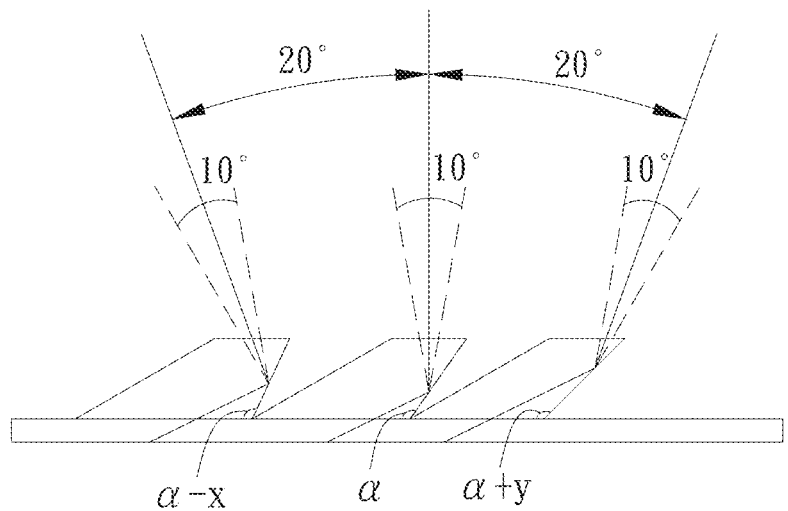
FIG. 6 is a schematic view showing the light emergent angle of an embodiment of the optical film of the display device of the present disclosure.
Figure 7A:
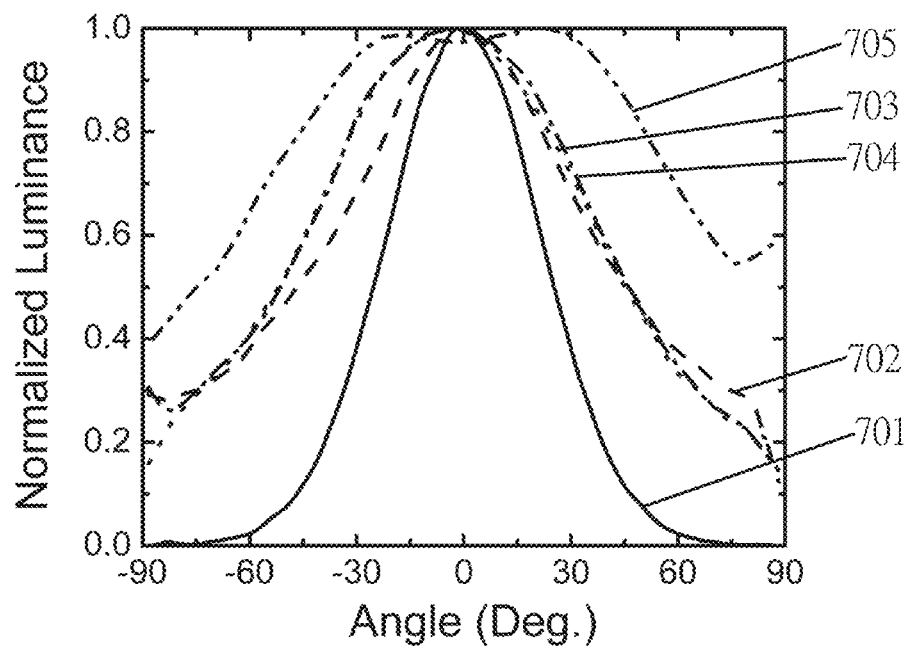
FIGS. 7A and 7B are schematic views showing the viewing angle performance in the horizontal direction and the vertical direction of an embodiment of the display device of the present disclosure.
Figure 7B:
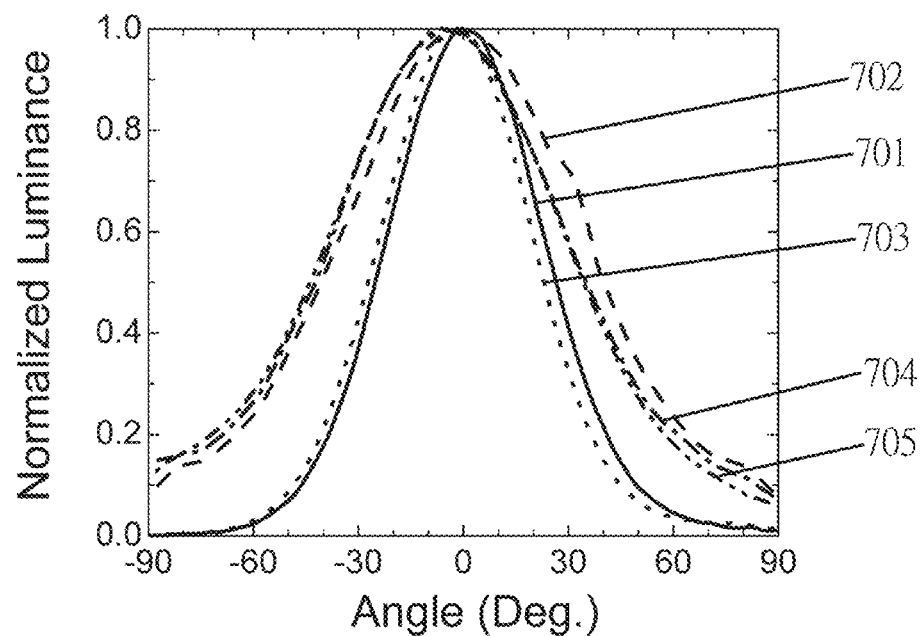

As shown in FIG. 6, when the optical film 10 is implemented in the display device 500, under the conditions that the refractive index of the optical film is 1.58, α is 125 degrees, and x is equal to y and is 10 degrees, the light emergent angle in the first direction A can be ±20 degrees. Moreover, FIGS. 7A and 7B are schematic views showing the viewing angle individually in the horizontal direction (e.g. the second direction B) and the vertical direction (e.g. the first direction A) of an embodiment of the display device 500 of the present disclosure, wherein the transverse axis represents the viewing angle (unit: degree), and the longitudinal axis represents the normalized luminance. In FIGS. 7A and 7B, curve 701 represents the use of a conventional optical film (i.e. same θ1, no γ, meaning the light output microstructures on the optical film is a trapezoid strap without periodic variation) and a backlight source with cone shaped light distribution (light confined in both of the first direction A and the second direction B); curve 702 represents the use of an embodiment of the optical film (i.e. periodically varied θ1 of 117, 125, 133 degrees and γ of 30 degrees) and a backlight source with cone shaped light distribution (light confined in both of the first direction A and the second direction B); curve 703 represents the use of the conventional optical film and a backlight source with cone shaped light distribution (light confined only in the first direction A); curve 704 represents the use of another embodiment of the optical film (i.e. periodically varied θ1 of 117, 125, 133 degrees and γ of 0 degrees) and a backlight source with cone shaped light distribution (light confined only in the first direction A); curve 705 represents the use of another embodiment of the optical film (i.e. periodically varied θ1 of 117, 125, 133 degrees and γ of 30 degrees) and a backlight source with cone shaped light distribution (light confined only in the first direction A). It is noted that FIGS. 7A and 7B both are schematic views of viewing angle vs. normalized luminance by using the optical film together with the diffusion plate. As shown in FIGS. 7A and 7B, when the normalized luminance is 0.5, the horizontal viewing angle of the display device 500 of the present disclosure in the vertical field switch is ±60 degrees, and the vertical viewing angle is ±50 degrees, both being significantly increased with respect to the prior art. In particular, comparing curve 704 and curve 705, it is found that when the configuration of prisms of the optical film has the angle γ (i.e. γ>0), the viewing angle and luminance in the horizontal direction (the second direction B) can be increased. Comparing curve 703 and curve 704, it is found that when the prisms of the optical film have periodically varied first angle θ1, the viewing angle and luminance in the vertical direction (the first direction A) can be increased. Therefore, either the periodically varied first angle θ1 or the angle γ can promote the viewing angle and optimize the luminance distribution. In addition, the backlight source used in curve 701 and curve 702 is different from the backlight source used in curve 703, curve 704, and curve 705. That is, light emitted from the backlight source used in curve 703, curve 704, and curve 705 is only confined in the first direction A; therefore, the viewing angle in the horizontal direction (the second direction B) will be wider.

Figure 8A:
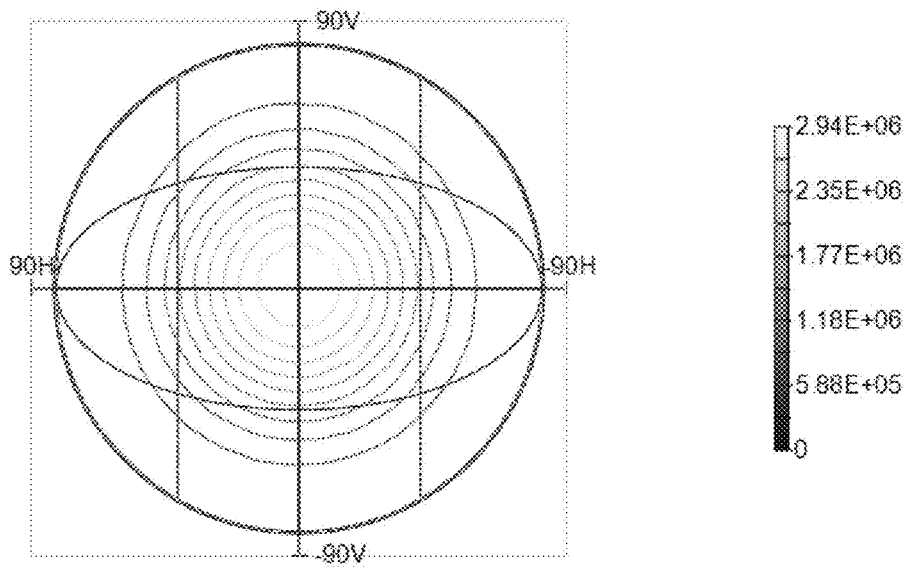
FIGS. 8A and 8D are plan views showing the simulated viewing angle performance of an embodiment of the display device of the present disclosure using different optical films in cooperation with the diffusion plate.
Figure 8B:
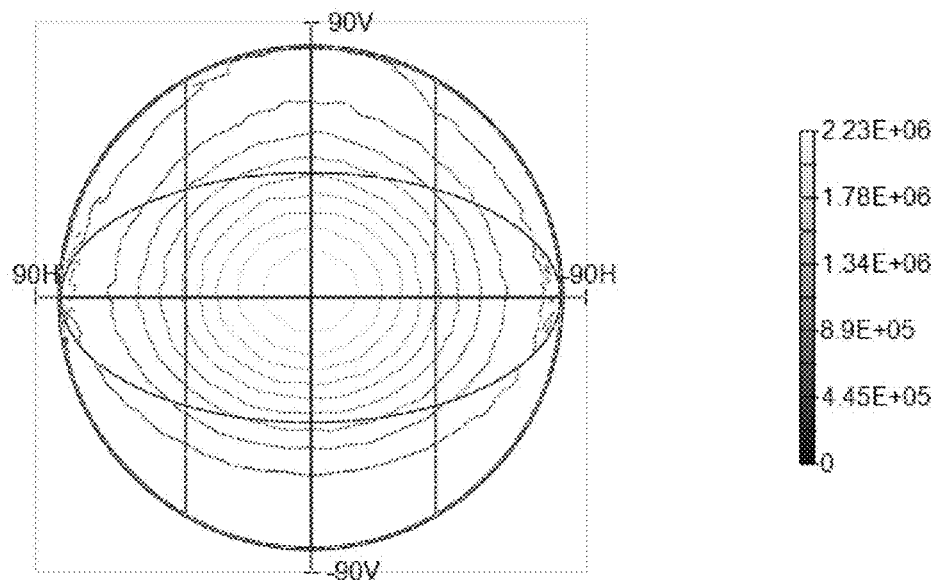

FIGS. 8A to 8D are plan views showing the simulated viewing angle performance of an embodiment of the display device of the present disclosure using different optical films in cooperation with the diffusion plate, wherein the diffusion angle of the diffusion plate is ±20 degrees. For example, if the luminance distribution is a Gaussian distribution, in cooperation with a backlight source having a cone shaped light distribution and an incident angle of 70±5 degrees (e.g. light confined in the first direction A and the second direction B), the full width at half maximum (FWHM) of the luminance is ±20 degrees with respect to the normal line to the optical film (i.e. the maximum of luminance occurs at angle of 0 degree). Specifically, FIG. 8A illustrates a plan view showing the simulated viewing angle performance of a conventional optical film, wherein light output microstructures thereof do not have periodically varied first angle θ1 in the first direction A and no acute angle γ in the second direction B. For example, the light output microstructures of the conventional optical film have a same first angle θ1 of 125 degrees and are disposed only along the first direction A. FIG. 8B illustrates a plan view showing the simulated viewing angle performance of the optical film of FIG. 3, wherein the light output microstructures of the light output structure 300 do not have periodically varied first angle θ1 in the first direction A but have an acute angle γ in the second direction B. For example, the first angles θ1 of the prisms 310 are the same (e.g. 125 degrees) and the angle γ is 20 degrees. From the comparison of FIGS. 8A and 8B, it is found that if the configuration of prisms in the second direction B is designed to have the acute angle γ, the viewing angle in the horizontal direction can be increased.

Figure 8C:
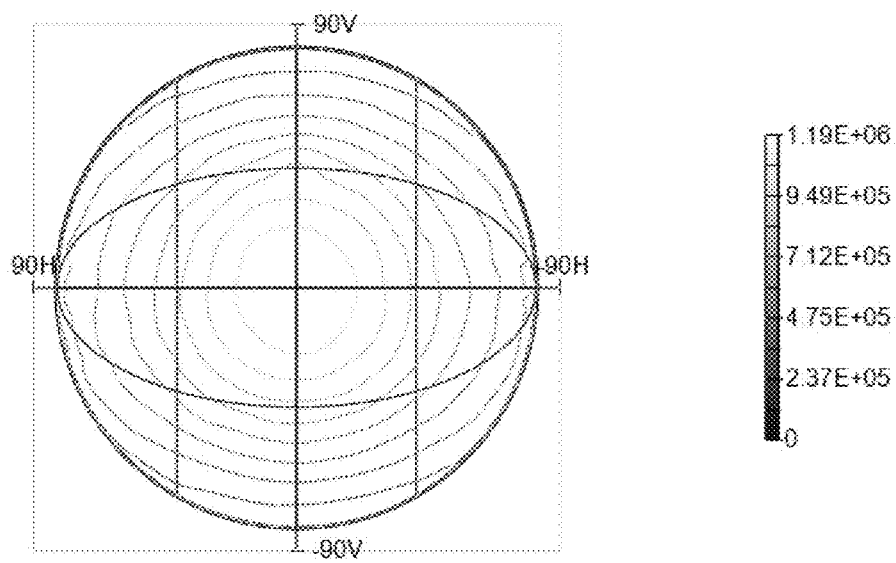

FIG. 8C illustrates a plan view showing the simulated viewing angle performance of the optical film of FIG. 3, wherein the light output microstructures of the light output structure 300 have periodically varied first angle θ1 in the first direction A and an acute angle γ in the second direction B. For example, the first angles θ1 of the prisms 310 in one period are respectively 117, 125, and 133 degrees (i.e. α=125, x=y=8), and the angle γ is 30 degrees. From the comparison of FIGS. 8B and 8C, it is found that if the configuration of prisms in the first direction A is designed to have periodically varied first angle θ1 and the acute angle γ is larger, the viewing angle in the vertical direction and in the horizontal direction can both be increased.

Figure 8D:
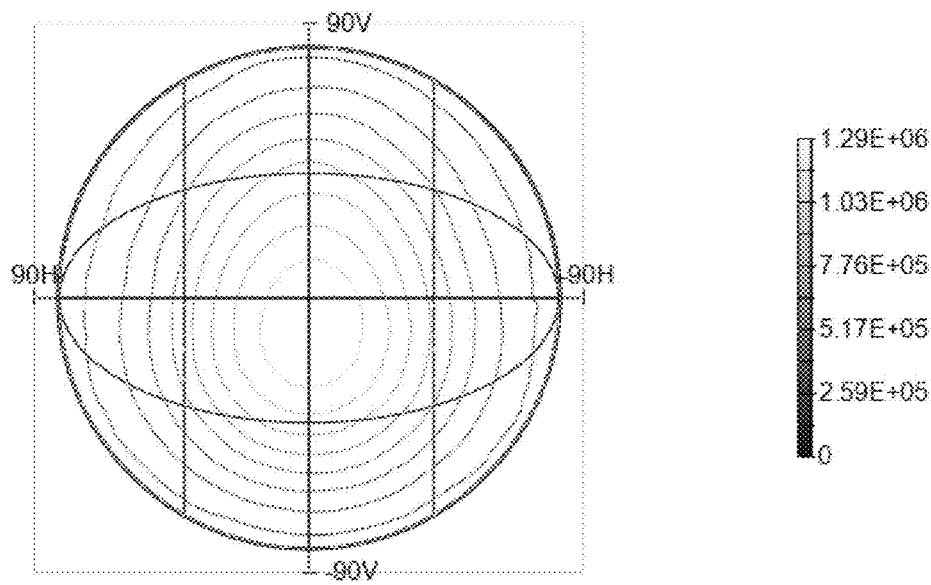

FIG. 8D illustrates a plan view showing the simulated viewing angle performance of the optical film of FIG. 4, wherein the light output microstructures of the light output structure 400 have periodically varied first angle θ1 in the first direction A and also have periodically varied angle γ in the second direction B. For example, the first angles θ1 of the prisms 410 in one period are respectively 117, 125, and 133 degrees (i.e. α=125, x=y=8), and the periodically varied third angles θ3 make the angles γ also periodically vary as 10, 20, and 30 degrees. From the comparison of FIGS. 8A and 8D, it is found that if the configuration of prisms is designed to have periodically varied first angle θ1 in the first direction A and periodically varied angle γ in the second direction B, the viewing angle in the vertical direction and in the horizontal direction can both be increased. From the comparison of FIGS. 8C and 8D, when the angle γ in the second direction B is a larger constant value, the viewing angle in the horizontal direction will become wider.

Figure 9A:
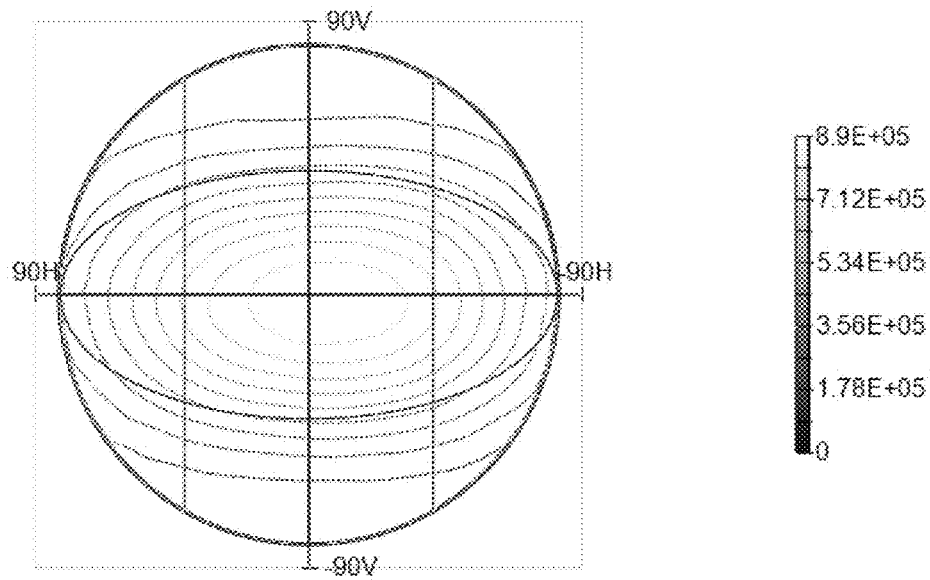
FIGS. 9A and 9C are plan views showing the simulated viewing angle performance of an embodiment of the display device of the present disclosure using different optical films in cooperation with the diffusion plate.
Figure 9B:
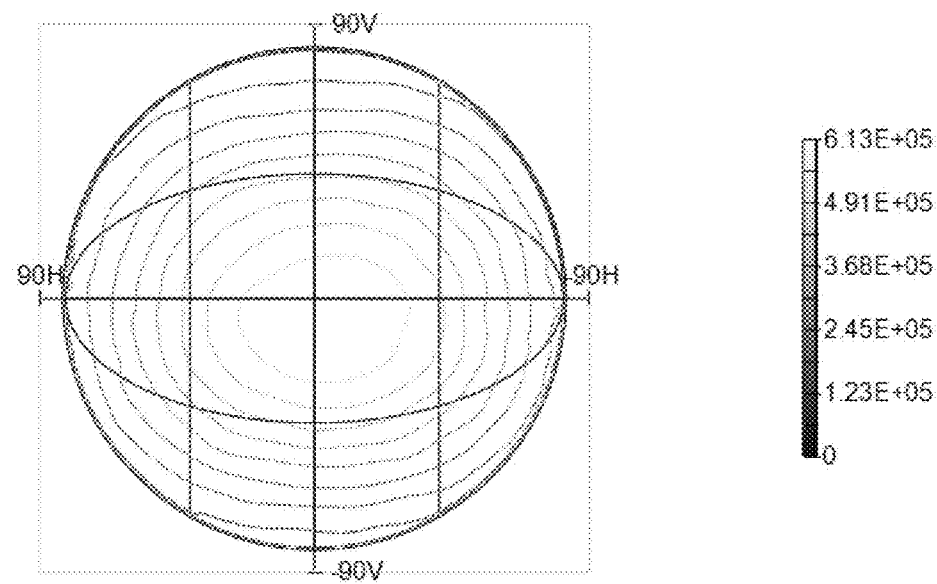
Figure 9C:
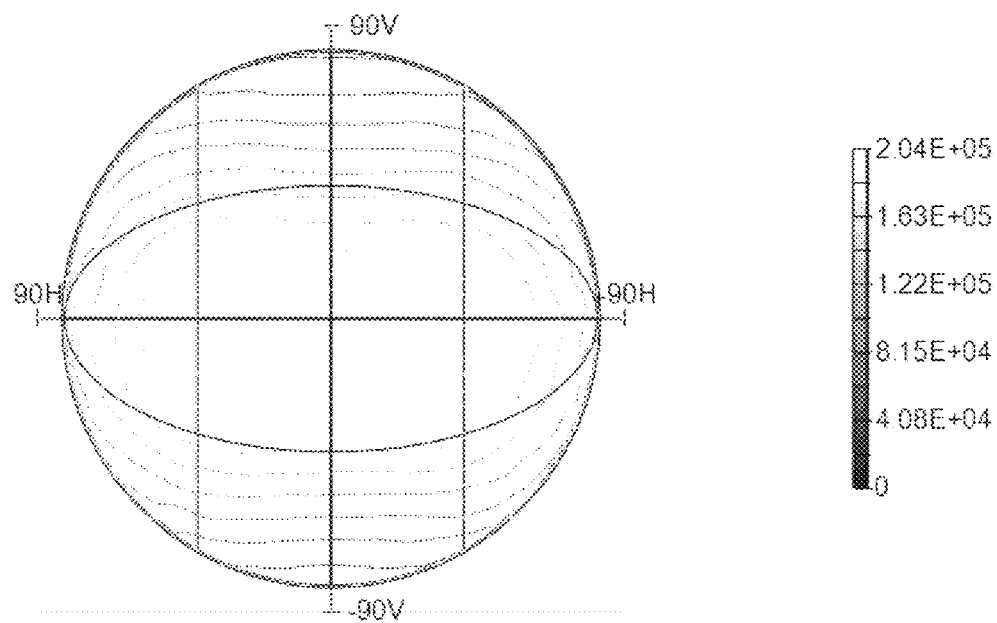

FIGS. 9A and 9C are plan views showing the simulated viewing angle performance of an embodiment of the display device of the present disclosure using different optical films in cooperation with the diffusion plate, wherein the diffusion angle of the diffusion plate is ±20 degrees (referring to the related descriptions of FIGS. 8A to 8D). The backlight is controlled so that the incident angle is 70±5 degrees in the first direction A and not limited in the second direction B. That is, the backlight source is confined in the first direction A and not in the second direction B, so that the viewing angle in the horizontal direction (i.e. the second direction B) of FIGS. 9A to 9C is larger than that of FIGS. 8A to 8D. Specifically, FIG. 9A illustrates a plan view showing the simulated viewing angle performance of a conventional optical film, wherein light output microstructures thereof do not have periodically varied first angle θ1 in the first direction A and no acute angle γ in the second direction B. For example, the light output microstructures of the conventional optical film have a same first angle θ1 of 125 degrees and are disposed only along the first direction A. FIG. 9B illustrates a plan view showing the simulated viewing angle performance of the optical film of FIG. 2, wherein the light output microstructures of the light output structure 200 have periodically varied first angle θ1 in the first direction A and no acute angle γ in the second direction B. For example, the first angles θ1 of the prisms 210 in one period are respectively 117, 125, and 133 degrees (i.e. α=125, x=y=8). From the comparison of FIGS. 9A and 9B, it is found that if the first angles θ1 of the prisms 210 arranged along the first direction A have angle values varying periodically, the viewing angle in the vertical direction can be increased, and the uniformity of luminance is enhanced.

FIG. 9C illustrates a plan view showing the simulated viewing angle performance of the optical film of FIG. 3, wherein the light output microstructures of the light output structure 300 have periodically varied first angle θ1 in the first direction A and an acute angle γ in the second direction B. For example, the first angles θ1 of the prisms 310 in one period are respectively 117, 125, and 133 degrees (i.e. α=125, x=y=8), and the angle γ is 30 degrees. From the comparison of FIGS. 9B and 9C, it is found that if the configuration of prisms 310 in the second direction B is designed to have the acute angle γ, the viewing angle in the horizontal direction can be increased.

It is noted that in the exemplary embodiments, the condition x=y or t=s is applied to illustrate the light emergent angle (i.e. viewing angle) being increased in a symmetric manner; however, in other embodiments, x can be different from y or t can be different from s to illustrate the light emergent angle (i.e. viewing angle) being increased in an asymmetric manner. That is, the optical film or the display device having the optical film of the present disclosure can increase the light emergent angle from the light output face and the viewing angle of the display device by means of the array of light output microstructures. Moreover, the optical film or the display device having the optical film of the present disclosure can increase the viewing angle in specific directions (e.g. horizontal direction, vertical direction, or both) of the display device by means of the prisms having periodically varied angle.

Although the preferred embodiments of present disclosure have been described herein, the above description is merely illustrative. The preferred embodiments disclosed will not limit the scope of the present disclosure. Further modification of the disclosure herein disclosed will occur to those skilled in the respective arts and all such modifications are deemed to be within the scope of the disclosure as defined by the appended claims.

What is claimed is:

1. An optical film, comprising:
   a light input face;
   a light output face opposite to the light input face; and
   a light-output structure disposed on the light output face, the light-output structure comprising:
      a plurality of prisms disposed along a first direction on the light output face, wherein each prism has a first quadrilateral cross section parallel to the first direction; a first side of the first quadrilateral cross section is connected to the light output face and includes a first angle with the light output face; the first angles of the prisms continuously arranged have angle values varying in a periodic manner.

2. The optical film of claim 1, wherein a second side of the first quadrilateral cross section is connected to the light output face and includes a second angle with the light output face; the second angles of the prisms are a same acute angle.

3. The optical film of claim 1, wherein the periodic manner refers to one period having four continuously arranged prisms, and the angle values of the first angles of the four continuously arranged prisms being α−x, α, α+y, and α, respectively, wherein x is equal to or different from y; x and y are independently larger than 0 and less than 30 degrees; α is larger than 90 degrees and less than or equal to 169 degrees.

4. The optical film of claim 1, wherein the first quadrilateral cross section is a trapezoid cross section.

5. The optical film of claim 1, wherein the prisms are further arranged along a second direction on the light output face to form a microstructure array; each prism has a second quadrilateral cross section parallel to the second direction; each second quadrilateral cross section has a third side and a fourth side respectively connected to the light output face; the third side of one of the second quadrilateral cross sections includes an acute angle with the fourth side of another adjacent second quadrilateral cross section.

6. The optical film of claim 5, wherein the acute angles have periodically varied angle values.

7. The optical film of claim 1, wherein the prisms are further arranged along a second direction on the light output face to form a microstructure array; each prism has a second quadrilateral cross section parallel to the second direction; a third side of each second quadrilateral cross section is connected to the light output face and includes a third angle with the light output face; the third angles of the prisms continuously arranged have angle values varying in a second periodic manner.

8. The optical film of claim 7, wherein a fourth side of the second quadrilateral cross section is connected to the light output face and includes a fourth angle; the fourth angles of the prisms are a same acute angle.

9. The optical film of claim 7, wherein the second periodic manner refers to one period having four continuously arranged prisms and the angle values of the third angles of the four continuously arranged prisms being β−t, β, β+s, and β, respectively, wherein t is equal to or different from s; t and s are independently larger than 0 and less than 45 degrees; β is larger than 45 degrees and less than 90 degrees; β−t, β, and β+s are all smaller than 90 degrees.

10. The optical film of claim 7, wherein the second quadrilateral cross section is a trapezoid cross section.

11. An optical film, comprising:
a light input face;
a light output face opposite to the light input face; and
a light-output structure disposed on the light output face, the light-output structure comprising:
a plurality of prisms disposed along a first direction and a second direction on the light output face to form a microstructure array, wherein:
each prism has a first quadrilateral cross section and a second quadrilateral cross section parallel to the first direction and the second direction, respectively;
each first quadrilateral cross section has a first side and a second side respectively connected to the light output face; the first side of one of the first quadrilateral cross sections is adjacent to the second side of another adjacent first quadrilateral cross section, wherein the first side of the first quadrilateral cross sections includes a first angle with the light output face; the first angles of the prisms continuously arranged have angle values varying in a periodic manner, wherein the periodic manner refers to one period having four continuously arranged prisms, and the angle values of the first angles of the four continuously arranged prisms being α−x, α, α+y, and α, respectively, wherein x is equal to or different from y; x and y are independently equal to or larger than 0 and less than 30 degrees; α is larger than 90 degrees and less than or equal to 169 degrees; and
each second quadrilateral cross section has a third side and a fourth side respectively connected to the light output face; the third side of one of the second quadrilateral cross sections is adjacent to and includes an acute angle with the fourth side of another adjacent second quadrilateral cross section.

12. The optical film of claim 11, wherein the first side of one of the first quadrilateral cross sections is adjacent to and includes an acute angle with the second side of another adjacent first quadrilateral cross section.

13. A display device, comprising:
a liquid crystal display panel having a display face and a bottom face opposite to the display face;
a backlight module disposed on the bottom face of the liquid crystal display panel, the backlight module providing backlight to the liquid crystal display panel; and
the optical film of claim 1, wherein the light input face of the optical film faces the display face of the liquid crystal display panel and receives light from the display face.

14. The display device of claim 13, wherein the liquid crystal display panel is a blue phase liquid crystal display panel.

15. The display device of claim 13, wherein the light from the display face enters the light input face at an incident angle; the incident angle is σ±Δσ degrees; σ is between 40 and 80 degrees; Δσ is between 2 and 15 degrees.

16. The display device of claim 13, wherein the optical film has a function of polarizing light.

17. A display device, comprising:
a liquid crystal display panel having a display face and a bottom face opposite to the display face;
a backlight module disposed on the bottom face of the liquid crystal display panel, the backlight module providing backlight to the liquid crystal display panel; and
the optical film of claim 11, wherein the light input face of the optical film faces the display face of the liquid crystal display panel and receives light from the display face.

18. The display device of claim 17, wherein the liquid crystal display panel is a blue phase liquid crystal display panel.

* * * * *